G. R. WATSON.
CAR FENDER.
APPLICATION FILED MAY 19, 1908.
919,097.
Patented Apr. 20, 1909.
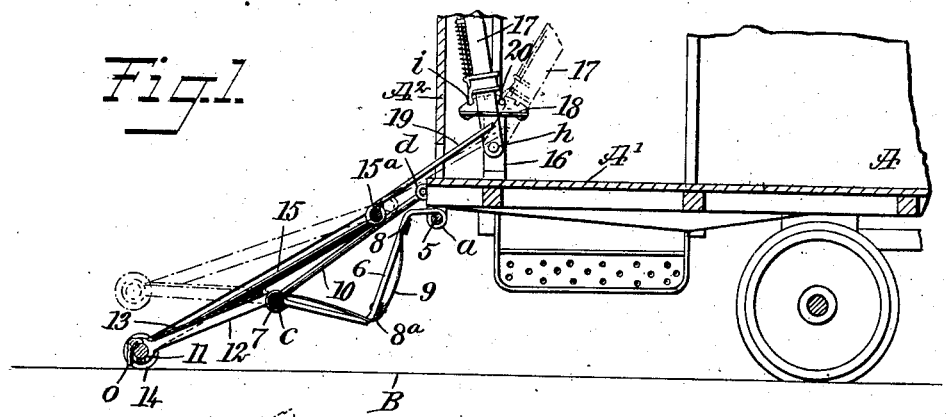
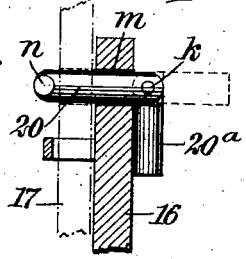
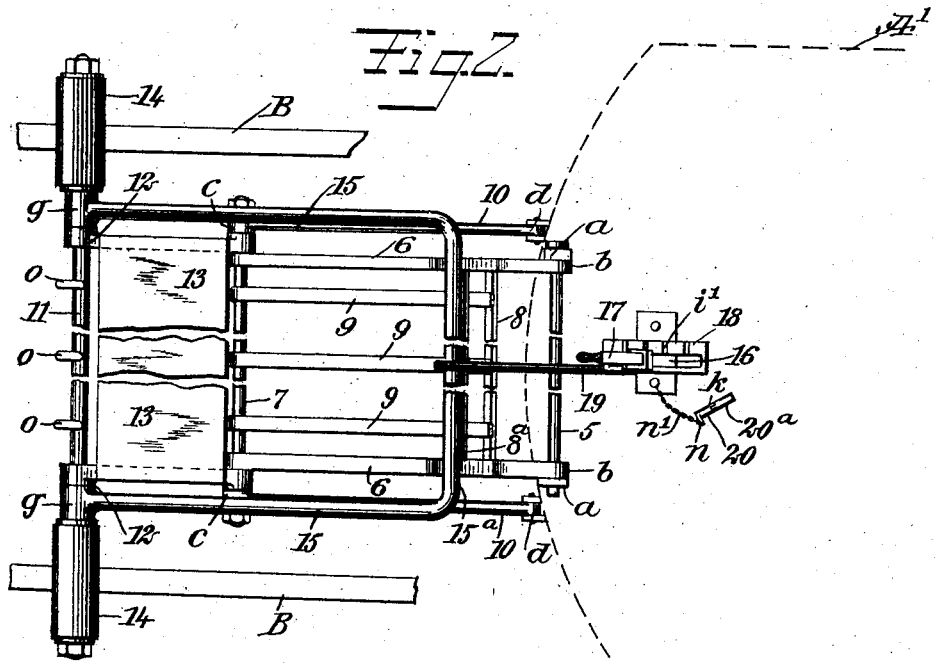
WITNESSES
INVENTOR
George R. Watson
BY
ATTORNEYS

UNITED STATES PATENT OFFICE.

GEORGE RANSOM WATSON, OF NORTH YAKIMA, WASHINGTON.

CAR-FENDER.

No. 919,097.  Specification of Letters Patent.  Patented April 20, 1909.

Application filed May 19, 1908. Serial No. 433,707.

*To all whom it may concern:*

Be it known that I, GEORGE RANSOM WATSON, a citizen of the United States, and a resident of North Yakima, in the county of Yakima and State of Washington, have invented a new and Improved Car-Fender, of which the following is a full, clear, and exact description.

The purpose of this invention is to provide novel details of construction for a car fender, that are extremely simple, practical and inexpensive, and which, when assembled and mounted upon a street car, will prevent serious accidents by catching and lifting into a safe position any one who has been struck by the fender.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a partly sectional side view of the improvement, and of an end portion of a car whereon the improvement is mounted; Fig. 2 is a plan view of the improved car fender applied upon a car, and Fig. 3 is an enlarged, partly sectional fragmentary view of details, showing a novel locking key for holding a lever secured, that controls the fender.

In the drawings, that show the improved fender and its application for service, A indicates a portion of a street car of common construction, A' the platform at one end of the car, and A² the transverse wall that guards the front end of the platform.

The fender consists of the following described parts:

A transversely-disposed carrier-bar 5 is hung from the lower side of the platform A' by the engagement of its ends with hanger-brackets $a$, $a$, and upon said carrier-bar the looped ends $b$ of two side bars 6 are loosely mounted. The side bars 6 are bent near their longitudinal centers into nearly right-angular shape, from points near their looped ends $b$, and are connected together at their remaining ends by a cross-bar 7, whereon other looped ends of the side bars are mounted. Near the rear looped ends $b$ of the side bars 6 a transverse fender-bar 8 is secured by its ends on the side bars 6, parallel with the carrier-bar 5.

A plurality of slat-like fender-bars 9 are secured by their ends at spaced intervals respectively on the cross-bar 7 and on the transverse fender-bar 8, said bars being bent to correspond with the bends given to the side-bars 6. The slatted fender-bars 9 also receive support from a cross-bar $8^a$, that is secured by its ends on the side bars 6, near their angular bends, as shown in Fig. 1.

The construction that has been described produces a longitudinally-slatted fender body that is hung by its rear end upon the forward end of the platform A', and to afford support for its forward end two similar brace-rods 10 are provided.

Upon the extended ends of the cross-bar 7 perforated hubs $c$ on the forward ends of the brace-rods 10 are loosely mounted, the rear ends thereof being hinged, as at $d$, upon the front end wall of the car-platform. The length of the brace-rods 10 is so proportioned that the slatted fender body hangs, as shown in Fig. 1, with the forward cross-bar 7 raised somewhat above the plane of the bends given to the side bars 6 and fender-bars 9, and it will be noted that the brace-rods also serve as lateral guards for the fender body.

At a suitable distance forward of the cross-bar 7 and parallel therewith a buffer-shaft 11 is rockably supported therefrom by two similar link-bars 12, said link bars having laterally-perforated hubs on their ends, which loosely receive the shaft 11 and bar 7, the engagement of the hubs on the rear ends of the link-bars with the cross-bar 7 being at the inner sides of the hubs on the brace-rods 10, as shown in Fig. 2.

A pliable apron 13 is mounted at its ends on the link bars 12, and stretched taut so as to cover the space between said bars, the cross bar 7, and the buffer shaft 11, said apron being made of woven wire cloth, stout canvas, or other preferred material.

The buffer shaft 11 is extended a distance outside of the apron 13, and on the ends of said shaft similar rollers 14 are loosely secured, these rollers being designed for engagement with the track rails B of a railway when the fender is in operative condition, this contact of the rollers disposing the buffer shaft near the road bed and the apron 13, inclined upward and rearward therefrom.

A yoke is provided for controlling the fender apron 13 and as shown in Fig. 2, consists of two limbs 15, 15, that at their forward ends are formed with hubs $g$, that are perforated laterally, and receive the buffer shaft 11, said hubs being disposed adjacent to the inner ends of the rollers 14. The limbs 15, 15, are spaced apart at their rear ends, by an integral transverse member 15$^a$, that is positioned a short distance forward of the end wall A$^2$ of the platform A'.

Upon the platform of the car at a suitable point, a post 16, is erected, and on the post the lower end of a lever 17 is pivoted, as at $h$ in Fig. 1, and thus supported nearly upright. The lever 17 is of well known construction, having a spring pressed dog $i$ thereon, that may be caused to interlock within any one of a series of notches $i'$, formed in a sector 18 carried by the post 16.

From the transverse member 15$^a$ on the adjusting yoke, a connecting rod 19 is extended and loosely secured at its rear end upon the lever 17 near its pivot $h$, said rod passing loosely through a slot in the end wall A$^2$, as shown in Fig. 1. It will be noted that the length of the connecting rod 19 is so proportioned, that when the lever 17 is rocked forward, the buffer shaft 11 will be lowered so that the rollers 14 thereon will rest on the rails B of the railway-track upon which the car A is located.

At any time the fender is to be raised and the front end removed from the track, which is usually done when the car runs in an opposite direction, and the fender on the other end of the car becomes available for use, this adjustment for the apron may be readily effected by rocking the lever 17 into a rearwardly inclined position, as shown by dotted lines in Fig. 1, the buffer shaft and apron then assuming an elevated position, as is indicated by broken lines in the same view.

It is found advantageous to provide means for holding the buffer shaft 11 in an elevated position when the car fender is not in service, and to this end a locking device for holding the lever 17 stationary is provided, consisting of a bolt 20, shown best in Fig. 3. The bolt 20 is cylindrical in the body, of a suitable length, and at a suitable distance from its ends is divided into two sections, 20, 20$^a$ that are hinged together at $h$, so that they may be fixed laterally.

In the rear edge of the post 16 a notch $m$ is formed of a suitable depth to receive the body of the bolt 20 and embed it therein, and in the body of the lever a half circular notch is formed transversely that will register with the notch $m$ and form a circular opening, this adjustment for the notches being effected when the lever is rocked rearward and the apron 13 is rocked into the position shown by dotted lines in Fig. 1. It will be seen that the bolt 20 may now be passed into the alined notches and lock the lever in its rearwardly inclined position; furthermore, the insertion of the bolt past the hinged joint $h$ will permit the end section 20$^a$ to drop by its gravity into the position shown in Fig. 3, which will prevent an accidental displacement thereof.

The bolt 20 may be connected at the head $n$ thereon, with a chain $n'$, or the like, for its connection with a stationary object near the pivot $h$, which will prevent its loss. It will be seen that when the apron 13 is inclined downward, the body of the buffer shaft 11 will be positioned near the road bed, and to prevent the apron from receiving small rocks or blocks of wood that may have been thrown upon the track, short, stout fingers $o$ are formed or secured on the buffer shaft, said fingers being projected downward and spaced apart, any number of the fingers being provided that is found to be effective in pushing obstructions ahead on the track to be subsequently removed.

When the apron 13 is in its catching position indicated by full lines in Fig. 1, it will be noted that an object struck by the buffer shaft 11 will be caught by the apron, and thence may pass rearward into the depressed receptacle formed by the slats 9, and thus be held safe from injury.

Having thus described my invention, I claim as new and desire to secure by Letters Patent:

1. A car fender comprising a body portion hung from the end of a car and having side bars of angular form, a plurality of angular slats corresponding with the angular side bars, and a forward and a rear cross bar connecting the side bars and to which the ends of said slats are secured, and a pliable apron mounted to rock on the forward cross bar of the body portion, and means for rocking the apron from the car.

2. A car fender, embodying a slatted fender body bent to depress its spaced slats between their ends, a pliable apron rockable on the front end of the slatted body, a lever on the car platform, and means for connecting said lever with the apron.

3. A car fender, embodying a body portion formed of side bars bent into angular form, a carrier bar on a car platform whereon the side bars are hung, a forward cross bar whereon the forward ends of the side bars are mounted, a plurality of slats bent to correspond with the side bars, and supporting brace rods extended from the forward cross bars and hinged at their extended ends upon the car platform.

4. A car fender, embodying a fender body formed of end cross bars, side bars bent at a right angle and jointed at their ends on the cross bars, a cross bar on the side bars near the upper end cross bar, a plurality of spaced and bent metal slats secured at their forward ends on the forward cross bar, and at their rear ends on the cross bar that is mounted on the side bars, brace rods at the sides of the fender body, an apron hinged on the forward cross bar of the fender body, a yoke connected with the apron, and a connecting rod, which, by rocked adjustment, controls a rocked adjustment of the apron.

5. A car fender comprising a fender body, a bar carried by a car and on which the said fender body is hung, brace rods at the sides of the fender body, an apron hinged to the front end of the fender body and having a buffer shaft at its front edge provided with rollers, a yoke connected with the buffer shaft, and means connected with the yoke for adjusting the buffer shaft and apron.

6. In a car fender of the character described, the pivoted lever adapted for controlling the rocking adjustment of the car fender, and the locking bolt having its body in two sections hinged together, said bolt being adapted for holding the lever from rocking.

In testimony whereof I have signed my name to this specification in the presence of two subscribing witnesses.

GEORGE RANSOM WATSON.

Witnesses:
   Geo. A. Dial,
   Walter O. Dial.